United States Patent
Bourdelais et al.

(10) Patent No.: US 6,888,663 B2
(45) Date of Patent: May 3, 2005

(54) OPTICAL ELEMENT CONTAINING NANO-COMPOSITE PARTICLES

(75) Inventors: Robert P. Bourdelais, Pittsford, NY (US); Narasimharao Dontula, Rochester, NY (US); Debasis Majumdar, Rochester, NY (US); Cheryl J. Kaminsky, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 380 days.

(21) Appl. No.: 10/265,974

(22) Filed: Oct. 7, 2002

(65) Prior Publication Data

US 2004/0028370 A1 Feb. 12, 2004

Related U.S. Application Data

(63) Continuation-in-part of application No. 10/216,121, filed on Aug. 9, 2002, now Pat. No. 6,832,037.

(51) Int. Cl.$^7$ .................... G02B 26/00; G03G 15/04
(52) U.S. Cl. .................... 359/296; 359/321; 430/63; 430/363; 428/1.1; 428/1.21; 252/584; 524/445; 385/141
(58) Field of Search ................. 359/296, 321; 430/63, 363; 428/1.2, 1.21; 252/582–584; 524/445; 385/141

(56) References Cited

U.S. PATENT DOCUMENTS

| | | | |
|---|---|---|---|
| 5,981,126 A | * 11/1999 | Majumdar et al. | 430/63 |
| 6,034,163 A | 3/2000 | Barbee et al. | 524/445 |
| 6,060,229 A | * 5/2000 | Eichorst et al. | 430/529 |
| 6,060,230 A | * 5/2000 | Christian et al. | 430/530 |
| 6,093,521 A | 7/2000 | Laney et al. | 430/363 |
| 6,177,153 B1 | 1/2001 | Uchiyama et al. | 428/1.1 |
| 6,225,039 B1 | * 5/2001 | Eichorst et al. | 430/529 |
| 6,266,476 B1 | 7/2001 | Shie et al. | 385/147 |
| 6,366,727 B1 | 4/2002 | Nojiri et al. | 385/123 |
| 6,403,231 B1 | 6/2002 | Mueller et al. | 428/474.4 |
| 6,475,713 B1 | * 11/2002 | Aylward et al. | 430/502 |
| 6,728,456 B1 | * 4/2004 | Aylward et al. | 385/124 |
| 2001/0003363 A1 | 6/2001 | Marien et al. | 252/589 |
| 2004/0066556 A1 | * 4/2004 | Dontula et al. | 359/599 |
| 2004/0067033 A1 | * 4/2004 | Aylward et al. | 385/124 |
| 2004/0067338 A1 | * 4/2004 | Kaminsky et al. | 428/141 |
| 2004/0214921 A1 | * 10/2004 | Chaiko | 523/200 |

FOREIGN PATENT DOCUMENTS

| | | |
|---|---|---|
| EP | 0 645 406 | 4/2001 |
| EP | 0 936 227 | 7/2002 |
| JP | 10-332909 | 12/1998 |

* cited by examiner

*Primary Examiner*—Evelyn A. Lester
(74) *Attorney, Agent, or Firm*—Arthur E. Kluegel

(57) ABSTRACT

The invention relates to an optical component comprising a dispersion of layered minute particulate materials in a binder, the layered materials having a layer thickness, a concentration of particulate in the binder, and a basal plane spacing sufficient to provide a component having a light transmissivity of at least 50%.

43 Claims, No Drawings

OPTICAL ELEMENT CONTAINING NANO-COMPOSITE PARTICLES

CROSS REFERENCE TO RELATED APPLICATIONS

This application is a Continuation-in-Part of U.S. Ser. No. 10/216,121 filed Aug. 9, 2002 now U.S. Pat No. 6,832,037. This application is one of a group of five related commonly assigned applications co-filed herewith under and the contents of which are incorporated herein by reference.

FIELD OF THE INVENTION

The invention relates to a polymer light diffuser containing a dispersion of layered minute particulate materials in a binder. In a preferred form, the invention relates to a back light diffuser for rear projection liquid crystal display devices.

BACKGROUND OF THE INVENTION

Optical structures that scatter or diffuse light generally function in one of two ways: (a) as a surface diffuser utilizing surface roughness to refract or scatter light in a number of directions; or (b) as a bulk diffuser having flat surfaces and embedded light-scattering elements.

A diffuser of the former kind is normally utilized with its rough surface exposed to air, affording the largest possible difference in index of refraction between the material of the diffuser and the surrounding medium and, consequently, the largest angular spread for incident light. However, some prior art light diffusers of this type suffer from two major drawbacks: a high degree of backscattering and the need for air contact. Backscattering causes reflection of a significant portion of the light back to the originating source when it should properly pass through the diffuser, lowering the efficiency of the optical system. The second drawback, the requirement that the rough surface must be in contact with air to operate properly, may also result in lower efficiency. If the input and output surfaces of the diffuser are both embedded inside another material, such as an adhesive for example, the light-dispersing ability of the diffuser may be reduced to an undesirable level.

In one version of the second type of diffuser, the bulk diffuser, small particles or spheres of a second refractive index are embedded within the primary material of the diffuser. In another version of the bulk diffuser, the refractive index of the material of the diffuser varies across the diffuser body, thus causing light passing through the material to be refracted or scattered at different points. Bulk diffusers also present some practical problems. If a high angular output distribution is sought, the diffuser will be generally thicker than a surface diffuser having the same optical scattering power. If however the bulk diffuser is made thin, a desirable property for most applications, the scattering ability of the diffuser may be too low.

Despite the foregoing difficulties, there are applications where an embedded diffuser may be desirable, where the first type of diffuser would not be appropriate. For example, a diffuser layer could be embedded between the output polarizer layer and an outer hardcoat layer of a liquid crystal display system to protects the diffuser from damage. Additionally, a diffuser having a thin profile, which will retain wide optical scattering power when embedded in other materials and have low optical backscatter and therefore higher optical efficiencies than conventional diffusers, would be highly desirable.

U.S. Pat. No. 6,093,521 describes a photographic member comprising at least one photosensitive silver halide layer on the top of said member and at least one photosensitive silver halide layer on the bottom of said member, a polymer sheet comprising at least one layer of voided polyester polymer and at least one layer comprising nonvoided polyester polymer, wherein the imaging member has a percent transmission of between 38 and 42%. While the voided layer described in U.S. Pat. No. 6,093,521 does diffuse back illumination utilized in prior art light boxes used to illuminate static images, the percent transmission between 38 and 42% would not allow a enough light to reach an observers eye for a liquid crystal display. Typically, for liquid crystal display devices, back light diffusers must be capable of transmitting at least 65% and preferably at least 80% of the light incident on the diffuser.

In U.S. Pat. No. 6,030,756 (Bourdelais et al), a photographic element comprises a transparent polymer sheet, at least one layer of biaxially oriented polyolefin sheet and at least one image layer, wherein the polymer sheet has a stiffness of between 20 and 100 millinewtons, the biaxially oriented polyolefin sheet has a spectral transmission between 35% and 90%, and the biaxially oriented polyolefin sheet has a reflection density less than 65%. While the photographic element in U.S. Pat. No. 6,030,756 does separate the front silver halide from the back silver halide image, the voided polyolefin layer would diffuse too much light creating a dark liquid crystal display image. Further, the addition of white pigment to the sheet causes unacceptable scattering of the back light.

In U.S. Pat. No. 4,912,333, X-ray intensifying screens utilize microvoided polymer layers to create reflective lenslets for improvements in imaging speed and sharpness. While the materials disclosed in U.S. Pat. No. 4,912,333 are transmissive for X-ray energy, the materials have a very low visible light energy transmission which is unacceptable for LC devices.

In U.S. Pat. No. 6,177,153, oriented polymer film containing pores for expanding the viewing angle of light in a liquid crystal device is disclosed. The pores in U.S. Pat. No. 6,177,153 are created by stress fracturing solvent cast polymers during a secondary orientation. The aspect ratio of these materials, while shaping incident light, expanding the viewing angle, do not provide uniform diffusion of light and would cause uneven lighting of a liquid crystal formed image. Further, the disclosed method for creating voids results in void size and void distribution that would not allow for optimization of light diffusion and light transmission. In example 1 of this patent, the reported 90% transmission includes wavelengths between 400 and 1500 nm integrating the visible and invisible wavelengths, but the transmission at 500 nm is less that 30% of the incident light. Such values are unacceptable for any diffusion film useful for image display, such as a liquid crystal display.

The need for having a thinner and stiffer base for imaging products is well recognized. In addition to providing cost advantage, thinner supports can fulfill many other criteria. For example, in motion picture and related entertainment industry, thinner photographic base allows for longer film footage for the same sized reels. However, a reduction in thickness of the base typically results in a reduction in stiffness, which can have detrimental effects in terms of curl, transport, and durability. For electronic display materials, such as liquid crystal display, it is desirable that the components be light in weight and flexible.

Recently, nanocomposite materials prepared using smectite clays have received considerable interest from industrial sectors, such as the automotive industry and the packaging industry, for their unique physical properties. These properties include improved heat distortion characteristics, barrier properties, and mechanical properties. The related prior art is illustrated in U.S. Pat. Nos. 4,739,007; 4,810,734; 4,894,411; 5,102,948; 5,164,440; 5,164,460; 5,248,720, 5,854,326, 6,034,163. However, the use of these nanocomposites as thinner and stiffer display components with specific optical properties has not been recognized.

In order to obtain stiffer polymeric supports using smectite clays, the clays need to be intercalated or exfoliated in the polymer matrix. There has been a considerable effort put towards developing methods to intercalate the smectite clays and then compatibilize with thermoplastic polymer matrix. This is because the clay lattice is naturally hydrophilic, and it must be chemically modified to be organophilic in order to allow its incorporation in the polymer matrices. To obtain the desired polymer property enhancements, most intercalation techniques developed so far are batch processes, time consuming and lead to increasing the overall product cost.

There are two major intercalation approaches that are generally used—intercalation of a suitable monomer followed by polymerization (known as in-situ polymerization, see A. Okada et. Al., *Polym Prep*. Vol. 28, 447, 1987) or monomer/polymer intercalation from solution. Polyvinyl alcohol (PVA), polyvinylpyrrolidone (PVP) and polyethylene oxide (PEO) have been used to intercalate the clay platelets with marginal success. As described by Levy et. al, in "Interlayer adsorption of polyvinylpyrrolidone on montmorillonite", *Journal of Colloid and Interface Science*, Vol 50 (3), 442, 1975, attempts were made to sorb PVP between the monoionic montmorillonite clay platelets by successive washes with absolute ethanol, and then attempting to sorb the PVP by contacting it with 1% PVP/ethanol/water solutions, with varying amounts of water. Only the Na-montmorillonite expanded beyond 20 Å basal spacing, after contacting with PVP/ethanol/water solution. The work by Greenland, "Adsorption of polyvinyl alcohol by montmorilonite", *Journal of Colloid Science*, Vol. 18, 647–664 (1963) discloses that sorption of PVA on the montmorrilonite was dependent on the concentration of PVA in the solution. It was found that sorption was effective only at polymer concentrations of the order of 1% by weight of the polymer. No further effort was made towards commercialization since it would be limited by the drying of the dilute intercalated layered materials. In a recent work by Richard Vaia et.al., "New Polymer Electrolyte Nanocomposites: Melt intercalation of polyethyleneoxide in mica type silicates", *Adv. Materials,* 7(2), 154–156, 1995, PEO was intercalated into Na-montmorillonite and Li-montmorillonite by heating to 80° C. for 2–6 hours to achieve a d-spacing of 17.7 Å. The extent of intercalation observed was identical to that obtained from solution (V. Mehrotra, E. P. Giannelis, *Solid State Commun.,* 77, 155, 1991). Other, recent work (U.S. Pat. No. 5,804,613) has dealt with sorption of monomeric organic compounds having at least one carbonyl functionality selected from a group consisting of carboxylic acids and salts thereof, polycarboxylic acids and salts thereof, aldehydes, ketones and mixtures thereof. Similarly U.S. Pat. No. 5,880,197 discusses the use of an intercalant monomer that contains an amine or amide functionality or mixtures thereof. In both these patents and other patents issued to the same group the intercalation is performed at very dilute clay concentrations in an intercalant carrier like water. This leads to a necessary and costly drying step, prior to intercalates being dispersed in a polymer. Disclosed in WO 93/04118 is the intercalation process based on adsorption of a silane coupling agent or an onium cation such as a quaternary ammonium compound having a reactive group that is compatible with the matrix polymer.

There are difficulties in intercalating and dispersing smectite clays in thermoplastic polymers. This invention provides a technique to overcome this problem. It also provides an article with improved dispersion of smectite clays that can be incorporated in a web.

PROBLEM TO BE SOLVED BY THE INVENTION

There remains a need for an improved light diffusion of image illumination light sources to provide improved diffuse light transmission efficiency while simultaneously diffusing specular light sources.

SUMMARY OF THE INVENTION

The invention provides an optical component comprising a dispersion of layered minute particulate materials in a binder, the layered materials having a layer thickness, a concentration of particulate in the binder, and a basal plane spacing sufficient to provide a component having a light transmissivity of at least 50%. The invention also provides a back lighted imaging media, a liquid crystal display component and device.

ADVANTAGEOUS EFFECT OF THE INVENTION

The invention provides improved light transmission while simultaneously diffusing specular light sources.

DETAILED DESCRIPTION OF THE INVENTION

The invention has numerous advantages over prior practices in the art. The invention provides diffusion of specular light sources that are commonly used in rear projection display devices such as liquid crystal display devices. Further, the invention, while providing diffusion to the light sources, has a high light transmission rate. A high transmission rate for light diffusers is particularly important for liquid crystal display devices as a high transmission value allows the liquid crystal display to be brighter or holding the level of brightness the same, allows for the power consumption for the back light to be reduces therefore extending the lifetime of battery powered liquid crystal devices that are common for note book computers. The nano-composite polymer layer useful in the invention can be easily changed to achieve the desired diffusion and light transmission requirements for many liquid crystal devices thus allowing the invention materials to be responsive to the rapidly changing product requirements in the liquid crystal display market.

The invention eliminates the need for an air gap between prior art light diffusers that contain a rough surface and the brightness enhancement films used in liquid crystal display devices. The elimination of the air gap allows for the diffuser materials to be adhesively bonded to other film components in the liquid crystal display making the unit lighter in weight and lower in cost.

The invention materials do not contain inorganic particles typical for prior art voided polymer films that cause unwanted scattering of the back light source and reduce the transmission efficiency of the liquid crystal display device. Further, the elastic modulus and scratch resistance of the diffuser is improved over prior art cast coated polymer diffusers rendering a more robust diffuser during the assembly operation of the liquid crystal device.

The present invention is an article, which uses layered materials such as smectite clay, preferably intercalated with an organic material having a hydrophilic component, and more preferably an additional oleophilic component. The aforesaid organic material can comprise a surfactant, an ethoxylated alocohol and/or a block co-polymer. The intercalated clay creates several index of refraction changes which diffuse visible light. The addition of the intercalated clay material to a bulk polymer layer improve the mechanical strength of the polymer sheet thereby increasing the scratch resistance of the sheet and improving the stiffness of the sheet allowing thinner, lower weight materials to be used. Thinner, lower weight materials reduce the weight and size of display devices allowing devices to be made smaller and lighter in weight. The intercalated clay materials useful in the invention also improves the thermal properties of the base polymer making the invention materials more thermally and optically stable at temperatures encountered in a hot car or in a military vehicle such as a tank. Thermal and optical stability increase the environmental range in which display devices can be utilized.

Further, the addition of the layered materials or particulates useful in the invention also improves the ink printability of the optical component allowing for the printing of ink based optical patterns such as reflection dots, text or graphics that may have value in transmitted optical applications. The layered particulates act as a bonding site for the ink chemistry creating high quality printed images that have outstanding ink retention. These and other advantages will be apparent from the detailed description below.

"Minute" particulate materials means an inorganic phase, such as a smectite clay, where at least one dimension of the particle, typically the layer thickness, is in the range of 0.1 to 100 nm on a numerical average basis. "Basal plane" means the (001) plane of the layered material as commonly defined in x-ray crystallography and "basal plane spacing" means the interlayer distance between nearest equivalent basal planes, on a numerical average basis, desirable in the range of 0.5 to 10 nm.

The term "LCD" mean any rear projection display device that utilizes liquid crystals to form the image. The term "diffuser" means any material that is able to diffuse specular light (light with a primary direction) to a diffuse light (light with random light direction). The term "light" means visible light. The term "diffuse light transmission efficiency" means the ratio of % diffuse transmitted light at 500 nm to % total transmitted light at 500 nm multiplied by a factor of 100. The term "polymeric film" means a film comprising polymers. The term "polymer" means homo- and co-polymers.

"Nanocomposite" shall mean a composite material wherein at least one component comprises an inorganic phase, such as a smectite clay, with at least one dimension in the 0.1 to 100 nanometer range. "Plates" shall mean particles with two dimensions of the same size scale and is significantly greater than the third dimension. Here, length and width of the particle are of comparable size but orders of magnitude greater than the thickness of the particle.

"Layered material" shall mean an inorganic material such as a smectite clay that is in the form of a plurality of adjacent bound layers. "Platelets" shall mean individual layers of the layered material. "Intercalation" shall mean the insertion of one or more foreign molecules or parts of foreign molecules between platelets of the layered material, usually detected by X-ray diffraction technique, as illustrated in U.S. Pat. No. 5,891,611 (line 10, col.5–line 23, col. 7).

"Intercalant" shall mean the aforesaid foreign molecule inserted between platelets of the aforesaid layered material. "Exfoliation" or "delamination" shall mean separation of individual platelets in to a disordered structure without any stacking order. "Intercalated" shall refer to layered material that has at least partially undergone intercalation and/or exfoliation. "Organoclay" shall mean clay material modified by organic molecules.

Better control and management of the back light are driving technological advances for liquid crystal displays (LCD). LCD screens and other electronic soft display media are back lit primarily with specular (highly directional) fluorescent tubes. Diffusion films are used to distribute the light evenly across the entire display area and change the light from specular to diffuse. Light exiting the liquid crystal section of the display stack leaves as a narrow column and must be redispersed. Diffusers are used in this section of the display to selectively spread the light out horizontally for an enhanced viewing angle.

Diffusion is achieved by light scattering as it passes though materials with varying indexes of refraction. This scattering produces a diffusing medium for light energy. There is an inverse relationship between transmittance of light and diffusion and the optimum combination of these two parameters must be found for each application.

The back diffuser is placed directly in front of the light source and is used to even out the light throughout the display by changing specular light into diffuse light. The diffusion film is made up of simple optical structures to broaden the light all directions. Prior art methods for diffusing LCD back light include layering polymer films with different indexes of refraction, embossing a pattern onto the film, or coating the film with matte resins or beads. The role of the front diffuser is to broaden the light coming out of the liquid crystal (LC) with directional selectivity. The light is compressed into a tight beam to enter the LC for highest efficient and when it exits it comes out as a narrow column of light. The diffuser uses optical structures to spread the light selectively. Most companies form elliptical micro-lens to selectively stretch the light along one axis. Elliptically shaped polymers in a polymer matrix and surface micro-lenses formed by chemical or physical means achieve this directionality. This patent focuses solely around light diffusion applications to evenly disperse light.

The invention provides a film that scatters the incident light uniformly. An optical component comprising a dispersion of minute particulate layered materials in a binder, the particles having a layer thickness, a concentration in the binder, and a basal plane spacing sufficient to provide a component having a light transmissivity of at least 50% is preferred. The particulate layered materials in a binder have been shown to provide excellent visible light diffusion. The layered materials create several index of refraction changes which diffuse transmitted visible light energy. Layered materials in a binder are preferred and have been shown to be a very efficient diffuser of light compared to prior art diffuser materials which rely on surface roughness on a polymer sheet to create light diffusion for LCD devices. There exists an index of refraction difference between the layered materials and the binder. In a preferred embodiment such a difference in refractive index is at least 0.01, more preferably 0.1 and most preferably 0.2. This index of refraction difference provides excellent diffusion and high light transmission which allows the LCD image to be brighter and/or the power requirements for the light to be reduced thus extending the life of a battery.

The concentration of the layered materials and their basal plane spacing control the amount of light diffusion. The invention has an unexpected property of being able to increase the amount of light diffusion without a significant change in transmission. Prior art visible light diffuser sheets generally exhibit a decrease in light transmission with an increasing amount of light diffusion.

The minute particles or layer thickness useful in the invention have a dimension in the range of from 0.1 to 100 nm. and typically from 0.5 to 10 nm. The average basal plane separation is desirably in the range of from 0.5 to 10 nm, preferably in the range of from 1 to 9 nm, and typically in the range of from 2 to 5 nm.

The optical component of the invention preferably has particulate layered materials with an aspect ratio between 10:1 and 1000:1. The aspect ratio of the layered material, defined as the ratio between the lateral dimension (i.e., length or width) and the thickness of the particle, is an important factor in the amount of light diffusion. An aspect ratio much less than 8:1 does not provide enough light diffusion. An aspect ratio much greater than 1000:1 is difficult to process.

The layered materials are preferably present in an amount between 1 and 10% by weight of the binder. Layered materials present in an amount less than 0.9% by weight of the binder have been shown to provide very low levels of light diffusion. Layered materials in an amount over 11% have been shown to provide little increase in light diffusion while adding unwanted color to the binder, coloring transmitted light. Layered materials that are present in an amount between 2 and 5% by weight of the binder are most preferred as the visible light diffusion is high while avoiding unwanted coloration and additional expense of additional materials. Further, layered materials present in the amount from 2 to 5% have been shown to provide excellent light diffusion for specular backlight assemblies such as those found in liquid crystal displays.

In another preferred embodiment of the invention, the layered materials are present in an amount between 0.1 and 1% by weight of said binder. By providing the layered materials between 0.1 and 1% by weight an optical element with a high light transmission (greater than 90%) and a low haze (less than 10%) results allowing the optical element to be used an external light diffuser with anti-glare properties. An anti-glare optical element reduces the glare created by ambient light such as sunlight which causes the quality of the transmission image to be reduced.

In another preferred embodiment of the invention, the optical component comprises two or more layers. By providing additional layers, to the optical element, improvements to the optical element such as anti-static properties, and light filtering properties can be accomplished in the additional layers. By providing a multiple layered optical element, the layered materials useful in the invention can be added to a specific location to control the focal length of the diffused light. It has been shown that by adding the layered materials useful in the invention to different layers in the optical component, the light intensity as a function of viewing angle can be changed thus allowing the invention materials to be customized to optimize an optical system. For example 2% weight addition of the layered materials useful in the invention can be added to an outermost layer of a 125 micrometer optical element. If the outermost layer containing the layered materials is oriented toward a light source the diffuse light intensity as a function of angle will be small at the normal compared to the case were the outermost layer is oriented away from the light source. The optical element preferably can have several layers containing different weight % addition of the layered materials useful in the invention to create a light diffusion gradient in the direction of the light travel.

The preferred light transmissivity of the optical element of the invention is at least 85%. A high level of light transmission provides improved brightness for back lighted displays while simultaneously diffusing the backlight source. A light transmission of at least 85% allows diffusion of the back light source and maximizes the brightness of the LC device significant improving the image quality of an LC device for outdoor use where the LC screen must compete with natural sunlight.

The preferred haze of the optical component of the invention is greater than 80%. A haze greater than 80% provides excellent light diffusion of specular light sources such as those found in liquid crystal displays. In another preferred embodiment of the invention, the haze of said optical component is between 20 and 60%. A light diffuser with a haze between 20 and 60% provides high light transmission and a low light diffusion, excellent for reducing unwanted moire fringes caused when two regular sets of lines overlap. In a LCD, a miore pattern is generated when two pieces of a prism film are overlapped to collimate the light just prior to the polarization sheets. In a further embodiment of the invention, the haze of the optical component of the invention is less than 10%. A haze value less than 10% is required for external diffusers of visible light as currently required for protective light diffuser sheet found on the outside of many portable display devices. The requirement of the light diffuser is a low haze value to remove any unwanted pixilization of the image and protect the delicate optical films from finger prints and scratching.

The layered materials suitable for this invention can comprise any inorganic phase desirably comprising layered materials in the shape of plates with significantly high aspect ratio. However, other shapes with high aspect ratio will also be advantageous, as per the invention. The layered materials suitable for this invention include phyllosilicates, e.g., montmorillonite, particularly sodium montmorillonite, magnesium montmorillonite, and/or calcium montmorillonite, nontronite, beidellite, volkonskoite, hectorite, saponite, sauconite, sobockite, stevensite, svinfordite, vermiculite, magadiite, kenyaite, talc, mica, kaolinite, and mixtures thereof. Other useful layered materials include illite, mixed layered illite/smectite minerals, such as ledikite and admixtures of illites with the clay minerals named above. Other useful layered materials, particularly useful with anionic matrix polymers, are the layered double hydroxides or hydrotalcites, such as $Mg_6Al_{3.4}(OH)_{18.8}(CO_3)_{1.7}H_2O$, which have positively charged layers and exchangeable anions in the interlayer spaces. Other layered materials having little or no charge on the layers may be useful provided they can be intercalated with swelling agents, which expand their interlayer spacing. Such materials include chlorides such as $FeCl_3$, $FeOCl$, chalcogenides, such as $TiS_2$, $MoS_2$, and $MoS_3$, cyanides such as $Ni(CN)_2$ and oxides such as $H_2Si_2O_5$, $V_6O_{13}$, $HTiNbO_5$, $Cr_{0.5}V_{0.5}S_2$, $V_2O_5$, Ag doped $V_2O_5$, $W_{0.2}V_{2.8}O7$, $Cr_3O_8$, $MoO_3(OH)_2$, $VOPO_4$-$2H_2O$, $CaPO_4CH_3$—$H_2O$, $MnHAsO_4$—$H_2O$, and $Ag_6Mo_{10}O_{33}$. Preferred layered materials are swellable so that other agents, usually organic ions or molecules, can intercalate and/or exfoliate the layered material resulting in a desirable dispersion of the inorganic phase. These swellable layered materials include phyllosilicates of the 2:1 type, as defined in clay literature (vide, for example, "An introduction to clay colloid chemistry," by H. van Olphen, John Wiley & Sons Publishers). Typical phyllosilicates with ion exchange capacity of 50 to 300 milliequivalents per 100 grams are preferred. Preferred layered materials for the present invention include smectite clay such as montmorillonite, nontronite, beidellite, volkonskoite, hectorite, saponite, sauconite, sobockite, stevensite, svinfordite, halloysite, magadiite, kenyaite and vermiculite as well as layered double hydroxides or hydrotalcites. Most preferred smectite clays include montmorillonite, hectorite and hydrotalcites, because of commercial availability of these materials.

The aforementioned particles can be natural or synthetic such as smectite clay. This distinction can influence the particle size and/or the level of associated impurities. Typically, synthetic clays are smaller in lateral dimension, and therefore possess smaller aspect ratio. However, synthetic clays are purer and are of narrower size distribution, compared to natural clays and may not require any further purification or separation. For this invention, the particles should have a lateral dimension of between 0.01 µm and 5 µm, and preferably between 0.05 µm and 2 µm, and more preferably between 0.1 µm and 1 µm. The thickness or the vertical dimension of the particles can vary between 0.5 nm and 10 nm, and preferably between 1 nm and 5 nm. The aspect ratio, which is the ratio of the largest and smallest dimension of the particles should be between 10:1 and 1000:1 for this invention. The aforementioned limits regarding the size and shape of the particles are to ensure adequate improvements in some properties of the nanocomposites without deleteriously affecting others. For example, a large lateral dimension may result in an increase in the aspect ratio, a desirable criterion for improvement in mechanical and barrier properties. However, very large particles can cause optical defects due to deleterious light scattering, and can be abrasive to processing, conveyance and finishing equipment as well as to other components.

The concentration of particles in the optical component of the invention can vary as per need; however, it is preferred to be <10% by weight of the binder. Significantly higher amounts of clay can impair physical properties of the optical component by rendering it brittle, as well as difficult to process. On the other hand, too low a concentration of clay may fail to achieve the desired optical effect. It is preferred that the clay concentration be maintained between 1 and 10% and more preferred to be between 1.5 and 5% for optimum results.

The particle materials, generally require treatment by one or more intercalants to provide the required interlayer swelling and/or compatibility with the matrix polymer. The resulting interlayer spacing is critical to the performance of the intercalated layered material in the practice of this invention. As used herein the "inter-layer spacing" refers to the distance between the faces of the layers as they are assembled in the intercalated material before any delamination (or exfoliation) takes place. The preferred clay materials generally include interlayer or exchangeable cations such as Na+, Ca+2, K+, and Mg+2. In this state, these materials do not delaminate in host polymer melts regardless of mixing, because their interlayer spacings are usually very small (typically equal to or less than about 0.4 nm) and consequently the interlayer cohesive energy is relatively strong. Moreover, the metal cations do not aid compatibility between layers and the polymer melt.

In the present invention, the particles are preferably intercalated by swelling agent(s) or intercalant(s), to increase interlayer distances to the desired extent. In general, the interlayer distance should be at least about 0.5 nm, preferably at least 2 nm, as determined by X-ray diffraction. The clay to swelling agent or intercalant weight ratio may vary from 0.1:99.9 and 99.9:01, but preferably between 1:99 and 90:10 and more preferably between 20:80 and 80:20.

The swelling agent or intercalant can be an organic material preferably comprising a hydrophilic component, and more preferably also comprising an oleophilic component. It is believed that the hydrophilic component participates in intercalation and the oleophilic component participates in compatibilization of the smectite clay. The aforesaid organic material can comprise a surfactant, a block co-polymer and/or an ethoxylated alocohol. In a most preferred embodiment, the aforesaid organic material is a block copolymer or an ethoxylated alcohol, similar to those disclosed in dockets 82,859; 82,857; and 82,056, incorporated herein by reference.

The preferred block copolymers useful in the invention are amphiphilic and have a hydrophilic and an oleophilic component. Further, the block copolymers useful in the invention can be of the two block or "A-B" type where A represents the hydrophilic component and B represents the oleophilic component or of the three block or "A-B-A" type. For example, the block copolymer may comprise three blocks and the matrix may comprise a copolymer or a blend of polymers compatible with at least one block of the copolymer. Also, where the matrix is a blend of polymers, individual polymers in the blend may be compatible with separate blocks of the copolymers. One presently preferred class of polymeric components that is useful for the hydrophilic component in this invention is poly(alkylene oxides) such as poly(ethylene oxide). The term poly(alkylene oxides) as used herein includes polymers derived from alkylene oxides such as poly(ethylene oxides) including mixtures of ethylene and propylene oxides. The most preferred is poly(ethylene oxide), because of its effectiveness in the present invention, its well-known ability to intercalate clay lattices through hydrogen bonding and ionic interactions, as well as its thermal processability and lubricity. The term poly(alkylene oxides) as used herein includes polymers derived from alkylene oxides such as poly (ethylene oxides) including mixtures of ethylene and propylene oxides. The most preferred is poly(ethylene oxide), mainly because of its effectiveness in the present invention, its commercial availability in a range of molecular weights and chemistries affording a wide latitude in the synthesis of the block copolymers.

Poly(ethylene oxides) are well known in the art and are described in, for example U.S. Pat. No. 3,312,753 at column 4. Useful (alkylene oxide) block contains a series of interconnected ethyleneoxy units and can be represented by the formula:

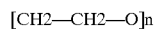

[CH2—CH2—O]n wherein the oxy group of one unit is connected to an ethylene group of an adjacent ethylene oxide group of an adjacent ethyleneoxy unit of the series.

Other useful hydrophilic components include poly 6, (2-ethyloxazolines), poly(ethyleneimine), poly (vinylpyrrolidone), poly(vinyl alcohol), polyacrylamides, polyacrylonitrile, polysaccharides and dextrans.

The oleophilic component of the block of the polymers useful in the present invention can also be selected from many common components. The oleophilic component is characterized in that it is at least partially miscible in the binder polymer useful in the invention, and/or interacts with the binder polymer, for example, through transesterfication. In the case of a polyester binder, the oleophilic block comprises polyester. Exemplary oleophilic components can be derived from monomers in such as: caprolactone; propiolactone; β-butyrolactone; δ-valerolactone; ε-caprolactam; lactic acid; glycolic acid; hydroxybutyric acid; derivatives of lysine; and derivatives of glutamic acid.

Other useful oleophilic components can be derived from α, β-ethylenically unsaturated monomers, such as olefins, styrenics and acrylates. Polymeric forms would include polycaprolactone; polypropiolactone; poly β-butyrolactone; poly δ-valerolactone; poly ε-caprolactam; polylactic acid; polyglycolic acid; polyhydroxybutyric acid; derivatives of polylysine; and derivatives of polyglutamic acid, polyolefins, polystyrene, polyacrylates, and polymers of α, β-ethylenically unsaturated monomers, such as olefins, styrenics and acrylates. Preferred components comprise polyester, polycaprolactone, polyamide, and polystyrene, because of their effectiveness in the present invention and compatibility with a wide rage of engineering thermoplastics.

The molecular weights of the hydrophilic component and the oleophilic component are not critical. A useful range for the molecular weight of the hydrophilic component is between about 300 and 50,000 and preferably 1,000 and 25,000. The molecular weight of the oleophilic component is between about 1,000 and 100,000 and preferably between 2,000 and 50,000. A preferred matrix compatible block comprises 50 to 500 monomer repeat units of caprolactone with a matrix polymer of polyester. Another preferred matrix compatible block comprises 25 to 100 monomer repeat units of ethylene with a matrix polymer of polyethylene. The preferred molecular weight ranges are chosen to ensure ease of synthesis and processing under a variety of conditions.

Ethoxylated alcohols are a class of nonionic surfactants derived from very long chain, linear, synthetic alcohols. These alcohols are produced as functional derivatives of low molecular weight ethylene homopolymers. These when reacted with ethylene oxide or propylene oxide yield condensation products known as oxylated alcohols. The average chain length of the hydrocarbon portion can be between 12 and 106 carbons but is not restricted to this. It is preferably in the 26–50 carbon range.

The relative efficiency of the hydrophilic and oleophilic portion of the ethoxylated alcohol molecule is controlled by changing the starting alcohol, changing the amount of ethylene oxide, or using propylene oxide. The ethylene oxide or propylene oxide content can range from 1 to 99% by weight, preferably 10–90% by weight. Thus the surfactant chemistry can be widely tailored for use in a wide range of applications. Typically they have been used as dispersion aids for pigments in paints, coatings and inks. They have been used as mold release components for plastics, nonionic emulsifiers, emulsifiers/lubricants for textile processing and finishing. The present invention finds that oxylated alcohols, especially ethoxylated alcohols, may be used for intercalation of smectite clays. These intercalated clays are easily dispersed in commercial polyolefin polymers and the degree of intercalation produced by the ethoxylated alcohols was not found to be not reduced after dispersion.

The smectite clay and the intercalant, preferably the block copolymer and/or the ethoxylated alcohol, useful in the invention can be interacted for intercalation by any suitable means known in the art of making nanocomposites. For example, the clay can be dispersed in suitable monomers or oligomers, which are subsequently polymerized. Alternatively, the clay can be melt blended with the block copolymer, oligomer or mixtures thereof at temperatures preferably comparable to their melting point or above, and sheared. In another method, the clay and the block copolymer can be combined in a solvent phase to achieve intercalation, followed by solvent removal through drying. Of the aforesaid methods, the one involving melt blending is preferred, for ease of processing.

In a preferred embodiment of the invention the clay, together with any optional addenda, is melt blended with the intercalant useful in the invention in a suitable twin screw compounder, to ensure proper mixing. An example of a twin screw compounder used for the experiments detailed below is a Leistritz Micro 27. Twin screw extruders are built on a building block principle. Thus, mixing of additives, residence time of resin, as well as point of addition of additives can be easily changed by changing screw design, barrel design and processing parameters. The Leistritz machine is such a versatile machine. Similar machines are also provided by other twin screw compounder manufacturers like Werner and Pfleiderrer and Berstorff which can be operated either in the co-rotating or the counter-rotating mode. The Leistritz Micro 27 compounder may be operated in the co-rotating or the counter rotating mode.

The screws of the Leistritz compounder are 27 mm in diameter, and they have a functionary length of 40 diameters. The maximum number of barrel zones for this compounder is 10. The maximum screw rotation speed for this compounder is 500 rpm. This twin screw compounder is provided with main feeders through which resins are fed, while additives might be fed using one of the main feeders or using the two side stuffers. If the side stuffers are used to feed the additives then screw design needs to be appropriately configured. The preferred mode of addition of clay to the block copolymer is through the use of the side stuffer, to ensure intercalation of the clay through proper viscous mixing and to ensure dispersion of the filler through the polymer matrix as well as to control the thermal history of the additives. In this mode, the intercalant is fed using the main resin feeder, and is followed by the addition of clay through the downstream side stuffer. Alternatively, the clay and the intercalant can be fed using the main feeders at the same location.

In yet another embodiment of the invention, the clay, the intercalant and the binder polymer together with any optional addenda are melt blended in a suitable twin screw compounder. One of the preferred modes of addition of clay and the intercalant to the matrix polymer is by the use of side stuffers to ensure intercalation of the clay through proper viscous mixing; the intercalant first followed by the addition of clay through the downstream side stuffer or vice versa. The mode of addition will be determined by characteristics of the intercalant. Alternatively, the clay and the intercalant are premixed and fed through a single side stuffer This method is particularly suitable if there is only one side stuffer port available, and also there are limitations on the screw design. Also preferred are methods where the clay and intercalant are fed using the main feeders at the same location as the binder resin.

In another preferred embodiment of the invention, the clay, together with any optional addenda, is melt blended with the intercalant useful in the invention using any suitable mixing device such as a single screw compounder, blender, mixer, spatula, press, extruder, or molder.

In the formation of an article comprising a suitable binder polymer and the intercalated clay useful in the invention, any method known in the art including those mentioned herein above can be utilized.

The end product of the instant invention, comprising the clay, the intercalant and the binder polymer together with any optional addenda, can be formed by any suitable method such as, extrusion, co-extrusion with or without orientation by uniaxial or biaxial, simultaneous or consecutive stretching, blow molding, injection molding, lamination, solvent casting, coating, drawing, spinning, or calendaring.

Since the optical component of the invention typically is used in combination with other optical web materials, a light diffuser with an elastic modulus greater than 500 MPa is preferred. An elastic modulus greater than 500 MPa allows for the light diffuser to be laminated with a pressure sensitive adhesive for combination with other optical webs materials. Further, because the light diffuser is mechanically tough, the light diffuser is better able to with stand the rigors of the assembly process compared to prior art cast diffusion films which are delicate and difficult to assemble. A light diffuser with an impact resistance greater than 0.6 GPa is preferred. An impact resistance greater than 0.6 GPa allows the light diffuser to resist scratching and mechanical deformation that can cause unwanted uneven diffusion of the light causing "hot" spots in an LC device.

The thickness of the optical component preferably is less than 250 micrometers or more preferably between 12.5 and 50 micrometers. Current design trends for LC devices are toward lighter and thinner devices. By reducing the thickness of the light diffuser to less than 250 micrometers, the LC devices can be made lighter and thinner. Further, by reducing the thickness of the light diffuser, brightness of the LC device can be improved by reducing light transmission. The more preferred thickness of the light diffuser is between 12.5 and 50 micrometers which further allows the light diffuser to be convienently combined with a other optical materials in an LC device such as brightness enhancement films. Further, by reducing the thickness of the light diffuser, the materials content of the diffuser is reduced. In another preferred embodiment of the invention, the thickness of the optical component is between 0.5 and 5 micrometers. This thickness allows for the coating of the layered particulates useful in the invention in a binder on an auxiliary web material or additional optical component such as a cover sheet or a brightness enhancement film to reduce the morie pattern resulting from ordered prism patterns.

The thickness uniformity of the optical component across the diffuser is preferably less than 0.10 micrometers. Thickness uniformity is defined as the diffuser thickness difference between the maximum diffuser thickness and the minimum diffuser thickness. By orienting the light diffuser of the invention, the thickness uniformity of the diffuser is less than 0.10 micrometers, allowing for a more uniform diffusion of light across the LC device compared to cast coated diffuser. As the LC market moves to larger sizes (40 cm diagonal or greater), the uniformity of the light diffusion becomes an important image quality parameter. By providing an optical element with thickness uniformity less than 0.10 micrometers across the diffusion web, the quality of image is maintained.

For the optical component of the invention, composite biaxially oriented polymer sheets are preferred and are manufactured by coextrusion of the core and surface layer (s), followed by biaxial orientation. For the biaxially oriented layer, suitable classes of thermoplastic polymers for the biaxially oriented sheet and the core matrix-polymer of the preferred composite sheet comprise polyolefins. Suitable polyolefins include polypropylene, polyethylene, polymethylpentene, polystyrene, polybutylene and mixtures thereof. Polyolefin copolymers, including copolymers of propylene and ethylene such as hexene, butene, and octene are also useful. The optical component of the invention is preferably provided with a one or more nonvoided skin layers. The composite sheet can be made with skin(s) of the same polymeric material as the core matrix, or it can be made with skin(s) of different polymeric composition than the core matrix. For compatibility, an auxiliary layer can be used to promote adhesion of the skin layer to the core. Any suitable polyester sheet may be utilized for the member provided that it is oriented. The orientation provides added strength to the multi-layer structure that provides enhanced handling properties when displays are assembled.

An optical component comprising polyester is also preferred as oriented polyester has excellent strength, impact resistance and chemical resistance. The polyester utilized in the invention should have a glass transition temperature between about 50.degree. C. and about 150.degree. C., preferably about 60–100.degree. C., should be orientable, and have an intrinsic viscosity of at least 0.50, preferably 0.6 to 0.9. Suitable polyesters include those produced from aromatic, aliphatic, or cyclo-aliphatic dicarboxylic acids of 4–20 carbon atoms and aliphatic or alicyclic glycols having from 2–24 carbon atoms. Examples of suitable dicarboxylic acids include terephthalic, isophthalic, phthalic, naphthalene dicarboxylic acid, succinic, glutaric, adipic, azelaic, sebacic, fumaric, maleic, itaconic, 1,4-cyclohexanedicarboxylic, sodiosulfoiso-phthalic, and mixtures thereof. Examples of suitable glycols include ethylene glycol, propylene glycol, butanediol, pentanediol, hexanediol, 1,4-cyclohexane-dimethanol, diethylene glycol, other polyethylene glycols and mixtures thereof. Such polyesters are well known in the art and may be produced by well-known techniques, e.g., those described in U.S. Pat. Nos. 2,465,319 and 2,901,466. Preferred continuous matrix polymers are those having repeat units from terephthalic acid or naphthalene dicarboxylic acid and at least one glycol selected from ethylene glycol, 1,4-butanediol, and 1,4-cyclohexanedimethanol. Poly(ethylene terephthalate), which may be modified by small amounts of other monomers, is especially preferred. Polypropylene is also useful. Other suitable polyesters include liquid crystal copolyesters formed by the inclusion of a suitable amount of a co-acid component such as stilbene dicarboxylic acid. Examples of such liquid crystal copolyesters are those disclosed in U.S. Pat. Nos. 4,420,607; 4,459,402; and 4,468,510.

The coextrusion, quenching, orienting, and heat setting of polyester diffuser sheets may be effected by any process which is known in the art for producing oriented sheet, such as by a flat sheet process or a bubble or tubular process. The flat sheet process involves extruding the blend through a slit die and rapidly quenching the extruded web upon a chilled casting drum so that the core matrix polymer component of the sheet and the skin components(s) are quenched below their glass solidification temperature. The quenched sheet is then biaxially oriented by stretching in mutually perpendicular directions at a temperature above the glass transition temperature, below the melting temperature of the matrix polymers. The sheet may be stretched in one direction and then in a second direction or may be simultaneously stretched in both directions. After the sheet has been stretched, it is heat set by heating to a temperature sufficient to crystallize or anneal the polymers while restraining to some degree the sheet against retraction in both directions of stretching.

The optional addenda mentioned herein above can include nucleating agents, fillers, plasticizers, impact modifiers, chain extenders, colorants, lubricants, antistatic agents, pigments such as titanium oxide, zinc oxide, talc, and calcium carbonate, dispersants such as fatty amides, (e.g., stearamide), metallic salts of fatty acids, e.g., zinc stearate, and magnesium stearate, colorants or dyes such as ultramarine blue or cobalt violet, antioxidants, optical brighteners, ultraviolet absorbers, fire retardants, roughening agents, and cross linking agents. These optional addenda and their corresponding amounts can be chosen according to need.

Preferred addenda for a polyester skin layer of the optical component to change the color include colored pigments that can resist extrusion temperatures greater than 320° C. This allows for high temperature co-extrusion of the polyester without any degradation of the colorant.

Another preferred addenda of this invention that could be added is an optical brightener. An optical brightener is substantially colorless, fluorescent, organic compound that absorbs ultraviolet light and emits it as visible blue light. Examples include but are not limited to derivatives of 4,4'-diaminostilbene-2,2'-disulfonic acid, coumarin derivatives such as 4-methyl-7-diethylaminocoumarin, 1-4-Bis (O-Cyanostyryl) Benzol and 2-Amino-4-Methyl Phenol. An unexpected desirable feature of this efficient use of optical brightener. Because the ultraviolet source for a transmission display material is on the opposite side of the image, the ultraviolet light intensity is not reduced by ultraviolet filters common to imaging layers. The result is less optical brightener is required to achieve the desired background color.

The oriented thermoplastic diffuser sheets of the present invention may be used in combination with one or more layers selected from an optical compensation film, a polarizing film and a substrate constitution a liquid crystal layer. The oriented film of the present invention is preferably used by a combination of oriented film/polarizing film/optical compensation film in the order. In the case of using the above films in combination in a liquid crystal display device, the films are preferably bonded with each other e.g. through a tacky adhesive for minimizing the reflection loss. The tacky adhesive is preferably those having a refractive index close to that of the oriented film to suppress the interfacial reflection loss of light.

The oriented thermoplastic diffusion sheet of the present invention may be used in combination with a film or sheet made of a transparent polymer. Examples of such polymer are polyesters such as polycarbonate, polyethylene terephthalate, polybutylene terephthalate and polyethylene naphthalate, acrylic polymers such as polymethyl methacrylate, and polyethylene, polypropylene, polystyrene, polyvinyl chloride, polyether sulfone, polysulfone, polyarylate and triacetyl cellulose.

The oriented thermoplastic diffuser sheet of the present invention may be incorporated with e.g. an additive or a lubricant such as silica for improving the drawability and the surface-slipperiness of the film within a range not to deteriorate the optical characteristics to vary the light-scattering property with an incident angle. Examples of such additive are organic solvents such as xylene, alcohols or ketones, fine particles of an acrylic resin, silicone resin or Δ metal oxide or a filler.

The optical component of the present invention usually has optical anisotropy. A biaxially drawn film of a thermoplastic polymer is generally an optically anisotropic material exhibiting optical anisotropy having an optic axis in the drawing direction. The optical anisotropy is expressed by the product of the film thickness d and the birefringence $\Delta n$ which is a difference between the refractive index in the slow optic axis direction and the refractive index in the fast optic axis direction in the plane of the film, i.e. $\Delta n*d$ (retardation). The orientation direction coincides with the drawing axis in the film of the present invention. The drawing axis is the direction of the slow optic axis in the case of a thermoplastic polymer having a positive intrinsic birefringence and is the direction of the fast optic axis for a thermoplastic polymer having a negative intrinsic birefringence. There is no definite requirement for the necessary level of the value of $\Delta n.*d$ since the level depends upon the application of the film, however, it is preferably 50 nm or more.

The invention may be used in conjunction with any liquid crystal display devices, typical arrangements of which are described in the following. Liquid crystals (LC) are widely used for electronic displays. In these display systems, an LC layer is situated between a polarizer layer and an analyzer layer and has a director exhibiting an azimuthal twist through the layer with respect to the normal axis. The analyzer is oriented such that its absorbing axis is perpendicular to that of the polarizer. Incident light polarized by the polarizer passes through a liquid crystal cell is affected by the molecular orientation in the liquid crystal, which can be altered by the application of a voltage across the cell. By employing this principle, the transmission of light from an external source, including ambient light, can be controlled. The energy required to achieve this control is generally much less than that required for the luminescent materials used in other display types such as cathode ray tubes. Accordingly, LC technology is used for a number of applications, including but not limited to digital watches, calculators, portable computers, electronic games for which light weight, low power consumption and long operating life are important features.

Active-matrix liquid crystal displays (LCDs) use thin film transistors (TFTs) as a switching device for driving each liquid crystal pixel. These LCDs can display higher-definition images without cross talk because the individual liquid crystal pixels can be selectively driven. Optical mode interference (OMI) displays are liquid crystal displays, which are "normally white," that is, light is transmitted through the display layers in the off state. Operational mode of LCD using the twisted nematic liquid crystal is roughly divided into a birefringence mode and an optical rotatory mode. "Film-compensated super-twisted nematic" (FSTN) LCDs are normally black, that is, light transmission is inhibited in the off state when no voltage is applied. OMI displays reportedly have faster response times and a broader operational temperature range.

Ordinary light from an incandescent bulb or from the sun is randomly polarized, that is, it includes waves that are oriented in all possible directions. A polarizer is a dichroic material that functions to convert a randomly polarized ("unpolarized") beam of light into a polarized one by selective removal of one of the two perpendicular plane-polarized components from the incident light beam. Linear polarizers are a key component of liquid-crystal display (LCD) devices.

There are several types of high dichroic ratio polarizers possessing sufficient optical performance for use in LCD devices. These polarizers are made of thin sheets of materials which transmit one polarization component and absorb the other mutually orthogonal component (this effect is known as dichroism). The most commonly used plastic sheet polarizers are composed of a thin, uniaxially-stretched polyvinyl alcohol (PVA) film which aligns the PVA polymer chains in a more-or-less parallel fashion. The aligned PVA is then doped with iodine molecules or a combination of colored dichroic dyes (see, for example, EP 0 182 632 A2, Sumitomo Chemical Company, Limited) which adsorb to and become uniaxially oriented by the PVA to produce a highly anisotropic matrix with a neutral gray coloration. To mechanically support the fragile PVA film it is then laminated on both sides with stiff layers of triacetyl cellulose (TAC), or similar support.

Contrast, color reproduction, and stable gray scale intensities are important quality attributes for electronic displays, which employ liquid crystal technology. The primary factor limiting the contrast of a liquid crystal display is the propensity for light to "leak" through liquid crystal elements or cell, which are in the dark or "black" pixel state. Furthermore, the leakage and hence contrast of a liquid crystal display are also dependent on the angle from which the display screen is viewed. Typically the optimum contrast is observed only within a narrow viewing angle centered about the normal incidence to the display and falls off rapidly as the viewing angle is increased. In color displays, the leakage problem not only degrades the contrast but also causes color or hue shifts with an associated degradation of color reproduction. In addition to black-state light leakage, the narrow viewing angle problem in typical twisted nematic liquid crystal displays is exacerbated by a shift in the brightness-voltage curve as a function of viewing angle because of the optical anisotropy of the liquid crystal material.

The optical element film of the present invention can even out the luminance when the film is used as a light-scattering film in a backlight system. Back-lit LCD display screens, such as are utilized in portable computers, may have a relatively localized light source (ex. fluorescent light) or an array of relatively localized light sources disposed relatively close to the LCD screen, so that individual "hot spots" corresponding to the light sources may be detectable. The optical element serves to even out the illumination across the display. The liquid crystal display device includes display devices having a combination of a driving method selected from e.g. active matrix driving and simple matrix drive and a liquid crystal mode selected from e.g. twist nematic, supertwist nematic, ferroelectric liquid crystal and antiferroelectric liquid crystal mode, however, the invention is not restricted by the above combinations. In a liquid crystal display device, the oriented film of the present invention is necessary to be positioned in front of the backlight. The optical element of the present invention can even the lightness of a liquid crystal display device across the display because the film has excellent light-scattering properties to expand the light to give excellent visibility in all directions. Although the above effect can be achieved even by the single use of such oriented film, plural number of films may be used in combination. The homogenizing optical element may be placed in front of the LCD material in a transmission mode to disburse the light and make it much more homogenous. The present invention has a significant use as a light source destructuring device. In many applications, it is desirable to eliminate from the output of the light source itself the structure of the filament which can be problematic in certain applications because light distributed across the sample will vary and this is undesirable. Also, variances in the orientation of a light source filament or arc after a light source is replaced can generate erroneous and misleading readings. A homogenizing optical element of the present invention placed between the light source and the detector can eliminate from the output of the light source any trace of the filament structure and therefore causes a homogenized output which is identical from light source to light source.

The optical element may be used to control lighting for stages by providing pleasing homogenized light that is directed where desired. In stage and television productions, a wide variety of stage lights must be used to achieve all the different effects necessary for proper lighting. This requires that many different lamps be used which is inconvenient and expensive. The films of the present invention placed over a lamp can give almost unlimited flexibility dispersing light where it is needed. As a consequence, almost any object, moving or not, and of any shape, can be correctly illuminated.

The reflection film formed by applying a reflection layer composed of an e.g. metallic film, to the oriented film of the present invention can be used e.g. as a retroreflective member for a traffic sign. It can be used in a state applied to a car, a bicycle, or a person.

The optical element of the present invention may also be used in the area of law enforcement and security systems to homogenize the output from laser diodes (LDs) or light emitting diodes (LEDs) over the entire secured area to provide higher contrasts to infrared (IR) detectors. The films of the present invention may also be used to remove structure from devices using LED or LD sources such as in bank note readers or skin treatment devices. This leads to greater accuracy.

Fiber-optic light assemblies mounted on a surgeon's headpiece can cast distracting intensity variations on the surgical field if one of the fiber-optic elements breaks during surgery. The optical element of the present invention placed at the ends of the fiber bundle homogenizes light coming from the remaining fibers and eliminates any trace of the broken fiber from the light cast on the patient. A standard ground glass diffuser would not be as effective in this use due to significant back-scatter causing loss of throughput.

The optical element of the present invention can also be used to homogeneously illuminate a sample under a microscope by destructuring the filament or arc of the source, yielding a homogeneously illuminated field of view. The films may also be used to homogenize the various modes that propagate through a fiber, for example, the light output from a helical-mode fiber.

The optical element of the present invention also have significant architectural uses such as providing appropriate light for work and living spaces. In typical commercial applications, inexpensive optical elements are used to help diffuse light over the room. A homogenizer of the present invention which replaces one of these conventional diffusers provides a more uniform light output so that light is diffused to all angles across the room evenly and with no hot spots.

The optical element of the present invention may also be used to diffuse light illuminating artwork. The optical element provides a suitable appropriately sized and directed aperture for depicting the artwork in a most desirable fashion.

Further, the oriented film of the present invention can be used widely as a part for an optical equipment such as a displaying device. For example, it can be used as a light-reflection plate laminated with a reflection film such as a metal film in a reflective liquid crystal display device or a front scattering film directing the film to the front-side (observer's side) in the case of placing the metallic film to the back side of the device (opposite to the observer), in addition to the aforementioned light-scattering plate of a backlight system of a liquid crystal display device. The optical element of the present invention can be used as an electrode by laminating a transparent conductive layer composed of indium oxide represented by ITO film. If the material is to be used to form a reflective screen, e.g. front projection screen, a light-reflective layer is applied to the optical element polymer surface.

EXAMPLES

In this series of examples, commercially available polyester polymer was melt extruded with Na Cloisite. In this the example below clay weight % addition to the polyester, compatibilizer weight % addition to the polyester and thickness were varied to produce a series of LC diffuser sheets. The example below will show that polyester polymer diffuser sheets containing a dispersion of minute layered particulates in a binder provide excellent light diffusion and high light transmission, both of which are required for a visible light diffusion sheet.

The following materials were used in making the examples of the invention.

Minute Layered Particulate

Na Cloisite clay, which is a natural montmorillonite, supplied by Southern Clay Products. The particles have a minute dimension or thickness numerical average of 1–5 nm and an average basal plane spacing in the range of 1–5 nm.

Polyester Binder

A blend of two types of polyester resins were used as a binder for dispersion of minute layered particulates, which were present on an average of 1–3 wt % in the binder:
  (i) PET (polyethylene terephthalate) 7352
  (ii) PETG (polyethylene terephthalate—glycolate) a fully amorphous polyester, both supplied by Eastman Chemicals.

Intercalants

Intercalant used was either of the following two copolymers which are known to intercalate clay:
  (i) PEO-b-PCL, a block copolymer poly (ethylene oxide-b-caprolactone), with PEO: PCL molecular weight ratio of 5000:20000.
  (ii) Pebax 1074, a block copolymer poly (ether-b-amide), formerly supplied by Elf Atochem.

Sample Preparation & Testing

The polyester, clay and the intercalant are compounded in different ratios in a 27 mm in diameter twin screw Leistritz compounder with a functionary length of 40 diameters. The compounding is carried out at 400 rpm at 260° C. The compounded materials are further blended with more polyester and extruded into cast sheets at ~270° C. The cast sheets are subsequently stretched bi-axially by 3.3×3.3 to form examples of the present invention.

Diffusion film samples were measured with the Hitachi U4001 UV/Vis/NIR spectrophotometer equipped with an integrating sphere. The total transmittance spectra were measured by placing the samples at the beam port towards the integrating sphere. A calibrated 99% diffusely reflecting standard (NIST-traceable) was placed at the normal sample port. The diffuse transmittance spectra were measured in like manner, but with the 99% tile removed. The diffuse reflectance spectra were measured by placing the samples at the sample port with the coated side towards the integrating sphere. In order to exclude reflection from a sample backing, nothing was placed behind the sample. All spectra were acquired between 350 and 800 nm. As the diffuse reflectance results are quoted with respect to the 99% tile, the values are not absolute, but would need to be corrected by the calibration report of the 99% tile.

Percentage total transmitted light refers to percent of light that is transmitted though the sample at all angles. Diffuse transmittance is defined as the percent of light passing though the sample excluding a 2 degree angle from the incident light angle. The diffuse light transmission efficiency is the percent of light that is passed through the sample by diffuse transmittance. Diffuse reflectance is defined as the percent of light reflected by the sample. The percentages quoted in the examples were measured at 500 nm. These values may not add up to 100% due to absorbencies of the sample or slight variations in the sample measured. The samples were measured for % light transmission and haze and the results are listed in Table 1 below.

TABLE 1

| Sample | Composition Binder wt. % | Clay wt. % | Compatibilizer wt. % | Thickness micrometers | Percent Transmission | Haze |
|---|---|---|---|---|---|---|
| K02-6-2 | 97.14 | 2 | 0.86 (PEO-b-PCL) | 0 | 84 | 69 |
| K02-6-4 | 97.14 | 2 | 0.86 (PEO-b-PCL) | 0 | 87 | 58 |
| K02-6-5 | 97.14 | 2 | 0.86 (PEO-b-PCL) | 13 | 88 | 48 |
| K02-6-6 | 97.71 | 1.6 | 0.69 (PEO-b-PCL) | 25 | 87 | 53 |
| K02-6-7 | 98.57 | 1 | 0.43 (PEO-b-PCL) | 21 | 90 | 41 |
| K02-6-9a | 97.14 | 2 | 0.86 (Pebax) | 21 | 86 | 63 |
| K02-6-9b | 97.14 | 2 | 0.86 (Pebax) | 38 | 85 | 68 |
| K02-6-13a | 96.57 | 2.4 | 1.03 (PEO-b-PCL) | 38 | 87 | 68 |
| K02-6-13b | 96.57 | 2.4 | 1.03 (PEO-b-PCL) | 38 | 81 | 79 |
| K02-6-14a | 96.19 | 2.67 | 1.14 (PEO-b-PCL) | 28 | 85 | 70 |
| K02-6-14b | 96.19 | 2.67 | 1.14 (PEO-b-PCL) | 39 | 82 | 77 |
| K02-6-15 | 95.71 | 3 | 1.29 | 25 | 82 | 75 |
| K02-6-16 | 96.19 | 2.67 | 1.14 (PEO-b-PCL) | 21 | 82 | 73 |

As the data above clearly show, a small addition of minute layered materials (Na Cloisite clay) in a polymer binder (polyester) provides excellent light diffusion of visible light energy. Small weight addition of the Na Cloisite clay provides a large increase in haze without significantly changing % transmission. This allows independent control of haze without a significant change in % transmission allowing optical system designers to optimize the output of display systems by increasing or decreasing haze without suffering a loss in brightness. Further, a haze value of 41 (sample K02-6-7) has utility as a top diffuser in a LCD optical stack were high transmission and low haze are required to disrupt any morie patterns created by ordered brightness enhancement films. A haze value of 79 (sample K02-6-13b) has utility as a bottom diffuser in a LCD optical stack were high transmission and high haze are required to diffuse any specular light from the LCD light guide. By providing haze greater than 50% while maintaining a high transmission, the brightness of display devices can be improved. A brighter display device has significant commercial value in that a brighter image allows for a reduction in battery power and better allows the display device to be used in demanding outdoor sunlight conditions.

Additionally, the light diffusion occurred in the bulk of the polyester sheet allowing the invention materials to be in optical contact with other optical components as the invention materials do not require an air gap as other prior art light diffusion materials that use surface roughness to create light diffusion. The invention materials were thin (less than 40 micrometers) allowing the invention materials to be used in display application were weight and space are important such as cell phones and watches.

While this example was primarily directed toward the use of thermoplastic materials for LC devices, the materials of the invention have value in other diffusion applications such as back light display, imaging elements containing a diffusion layer, a diffuser for specular home lighting, back lighted signs and privacy screens.

The entire contents of the patents and other publications referred to in this specification are incorporated herein by reference.

What is claimed is:

1. An optical component comprising a dispersion of layered minute particulate materials in a binder, the layered materials having a layer thickness, a concentration of particulate in the binder, and a basal plane spacing sufficient to provide a component having a light transmissivity of at least 50% wherein said layered material comprises smectite clay or a layered double hydroxide.

2. The optical component of claim 1 wherein said layered materials have an aspect ratio between 10:1 and 250:1.

3. The optical component of claim 1 wherein the layered materials are present in an amount between 1 and 10% by weight of said binder.

4. The optical component of claim 1 wherein the layered materials are present in an amount between 1.5% and 5% by weight of said binder.

5. The optical component of claim 1 wherein said light transmissivity is at least 85%.

6. The optical component of claim 1 wherein said optical component diffuses visible transmitted light energy.

7. The optical component of claim 6 wherein the haze of said optical component is greater than 80%.

8. The optical component of claim 6 wherein the haze of said optical component is between 20 and 60%.

9. The optical component of claim 6 wherein the haze of said optical component is less than 10%.

10. The optical component of claim 1 wherein said layered material comprises oxylated alcohol intercalated in smectite clay.

11. The optical component of claim 10 wherein said oxylated alcohol comprises ethoxylated alcohol.

12. The optical component of claim 10 wherein said ethoxylated alcohol has a hydrocarbon chain length of between 12 and 106 carbons.

13. The optical component of claim 10 wherein said ethoxylated alcohol has a hydrocarbon chain length of between 26–50 carbons.

14. The optical component of claim 10 wherein said ethoxylated alcohol intercalated in smectite clay is dispersed in polyolefin polymer.

15. The optical component of claim 10 wherein said ethoxylated alcohol intercalated in smectite clay is dispersed in polyolefin polymer and at least one layer of polymer not containing intercalated smectite are integrally connected during simultaneous extrusion.

16. The optical component of claim 1 wherein said layered material is synthetic clay.

17. The optical component of claim 1 wherein said layered material is organically modified.

18. The optical component of claim 1 wherein said binder comprises at least one layer of polyester.

19. The optical component of claim 1 wherein said binder comprises at least one layer of polyolefin.

20. The optical component of claim 1 wherein the difference in refractive index between layered material and binder is greater than 0.08.

21. The optical component of claim 1 wherein the elastic modulus of the optical component is greater than 500 MPa.

22. The optical component of claim 1 wherein the impact resistance of the optical component is greater than 0.6 GPa.

23. The optical component of claim 1 wherein the layer particulates are present in an amount between 0.1 and 1% by weight of said binder.

24. The optical component of claim 1 wherein the optical component comprises two or more layers.

25. The optical component of claim 24 wherein said minute layered particulates are present in at least one layer.

26. The optical component of claim 1 wherein the minute layered materials have a lateral dimension of 0.01 to 5 μm and a thickness of 0.5 to 10 nm.

27. The optical component of claim 1 wherein the layered minute layered materials have a basal plane spacing of from 1 to 9 nm.

28. The optical component of claim 1 wherein said layered material comprises a block copolymer intercalated in smectite clay.

29. The optical element of claim 28 further comprises a hydrophilic block that intercalates clay.

30. The optical element of claim 28 wherein the block copolymer further comprises an oleophilic block.

31. The optical component of claim 29 wherein said hydrophilic block comprises at least one member selected from the group consisting of poly(alkylene oxide), poly 6, (2-ethyloxazolines), poly(ethyleneimine), poly (vinylpyrrolidone), poly (vinyl alcohol), polyacrylamides, polyacrylonitrile, polysaccharides, and dextrans.

32. The optical component of claim 29 wherein said hydrophilic block comprises poly(ethylene oxide).

33. The optical component of claim 29 wherein said hydrophilic block comprises polysaccharide.

34. The optical component of claim 29 wherein said hydrophilic block comprises polyvinyl pyrrolidone.

35. The optical component of claim 30 wherein said oleophilic block comprises at least one member selected from the group consisting of polycaprolactone, polypropiolactone, poly β-butyrolactone; poly δ-valerolactone; poly ε-caprolactam; polylactic acid; polyglycolic acid; polyhydroxybutyric acid; derivatives of polylysine; and derivatives of polyglutamic acid, polymers of α, β-ethylenically unsaturated monomers.

36. The optical component of claim 30 wherein said oleophilic block comprises polyester.

37. The optical component of claim 30 wherein said oleophilic block comprises polycaprolactone.

38. The optical component of claim 30 wherein said oleophilic block comprises polyamide.

39. The optical component of claim 30 wherein said oleophilic block comprises polystyrene.

40. The optical component of claim 1 wherein the minute particulate materials have a lateral dimension of 0.01 to 5 μm and a thickness of 0.5 to 10 nm.

41. The optical component of claim 1 wherein the layered minute particulate materials have a basal plane spacing of from 1 to 9 nm.

42. A back lighted imaging media comprising an optical component comprising a dispersion of minute layered particulates in a binder, the particles having a layer thickness, a concentration of particulate in the binder, and a particulate basal plane spacing sufficient to provide a component having a light transmissivity of at least 50% wherein said layered material comprises smectite clay or a layered double hydroxide.

43. A liquid crystal device comprising an optical component comprising a dispersion of minute layered particulates in a binder, the particles having a layer thickness, a concentration of partictalate in the binder, and a particulate basal plane spacing sufficient to provide a component having a light transmissivity of at least 50% located between the light source and a polarizing film wherein said layered material comprises smectite clay or a layered double hydroxide.

* * * * *